United States Patent

[11] 3,617,144

| [72] | Inventors | Eldo K. Koppelmann;<br>William S. Holloway, both of Cumberland, R.I. |
|---|---|---|
| [21] | Appl. No. | 844,346 |
| [22] | Filed | July 24, 1969 |
| [45] | Patented | Nov. 2, 1971 |
| [73] | Assignee | Madison Industries, Inc. |

[54] ADJUSTABLE BORING BAR
2 Claims, 6 Drawing Figs.

[52] U.S. Cl. ........................................... 408/187
[51] Int. Cl. .................................... B23b 29/034
[50] Field of Search ........................... 77/58, 58.3, 58.36, 58.37, 58.38

[56] References Cited
UNITED STATES PATENTS

| 3,433,104 | 3/1969 | Milewski et al. | 77/58 R |
| 1,393,260 | 10/1921 | Carr | 77/58 |
| 2,438,607 | 3/1948 | Jackson | 77/58 |
| 2,520,342 | 8/1950 | Ross | 77/58 |
| 3,069,932 | 12/1962 | Sweeny et al. | 77/58 |
| 3,486,401 | 12/1969 | Kelm | 77/58 |

FOREIGN PATENTS

| 157,329 | 12/1956 | Sweden | 77/58 |
| 167,342 | 8/1921 | Great Britain | 77/58 |
| 541,162 | 11/1941 | Great Britain | 77/58 |
| 554,820 | 7/1943 | Great Britain | 77/58 |

Primary Examiner—Gerald A. Dost
Attorney—Barlow and Barlow

ABSTRACT: A two-part adjustable boring bar assembly consisting of a shank and an adjustable head, the adjustable head being received in an end slot of the boring bar and having keyway engagement with the slot to maintain the proper attitude of the adjustable head with the bar. An adjusting screw is provided and captured in one of the parts, the threads of which engage the other of the parts to traverse the head transverse of the boring bar.

PATENTED NOV 2 1971 3,617,144

INVENTORS
ELDO K. KOPPELMANN
WILLIAM S. HOLLOWAY

BY

Barlow & Barlow
ATTORNEYS

ADJUSTABLE BORING BAR

Background of the Invention

The classical boring bar utilized a shank of tool steel and was provided at one end with a cutting portion which was suitably ground for that purpose. There evolved the use of a separate tool bit which was clamped in some fashion on a shank or was affixed to the end of the shank as by welding. Since versatility is often desired, screw clamp arrangements have been utilized to secure cutting tips to the ends of boring bar and some attempts have been made to provide an entire assembly which would be adjustable relative to the end of the bar, as for example, in the Severson U.S. Pat. No. 3,027,786 where a cutter insert is laterally adjustably mounted. Other approaches at providing adjustability are shown, as for example, in the Thomas U.S. Pat. No. 2,838,316 where the bit holder proper is adjustable transversely of the mounting shank, which bit holder mounts an elongated boring bit that has been suitably ground with a cutting tip at the end thereof. In order to obtain accuracy in these prior art structures, it is necessary that deflection be kept to a minimum which is not possible in an adjustable holder with an extended thin cross section boring bar such as in the Thomas patent and the arrangement in the Severson patent is not sufficiently rigid due to the excessive reduction in shank cross section at the tip to insure a high degree of accuracy since the adjusted cutter is in effect being merely clamped into position by a clamping screw which is exerting only a point pressure on the cutter bit holder. The instant invention overcomes some of these difficulties by providing a rugged boring bar with an adjustable cutter.

SUMMARY OF THE INVENTION

A boring bar consisting of a cylindrical shank having a transverse slot into which an adjustable cutter holder is slidably fitted. An interlock for lateral stability between the slot and the cutter holder is provided by the use of a V and V recess arrangement. A positioning means consisting of a screw that is captured in recesses in the cutter holder and which threadingly engage at least one face of the slot in the shank body is provided to index and adjust the position of the cutter and the cutter holder relative to the shank. As illustrated in the drawing, a cutter insert is contemplated to be fastened into the cutter holder by suitable means, the cutter insert being any suitable hard metal cutting material such as tungsten carbide. In the illustrated form of holding the metal cutting insert, a block which exerts pressure on the insert is shown and this block is seated in a cavity in the cutter holder in such a way that no depressions are formed in the cutter holder so that chips created during the cutting operation will not be trapped.

DESCRIPTION OF THE PREFERRED EMBODIMENT

Figure 1:
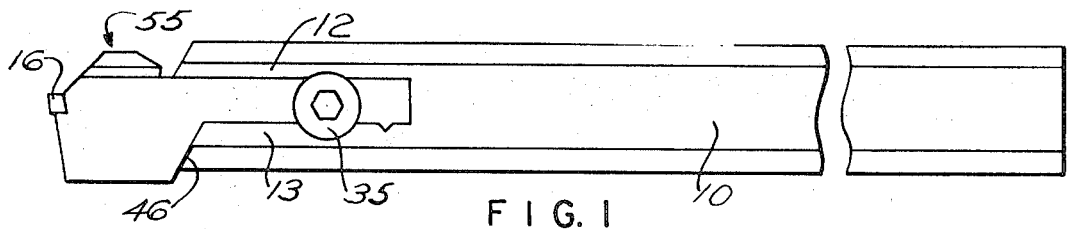
FIG. 1 is a side elevational view of the adjustable boring bar of the invention.
Figure 2:
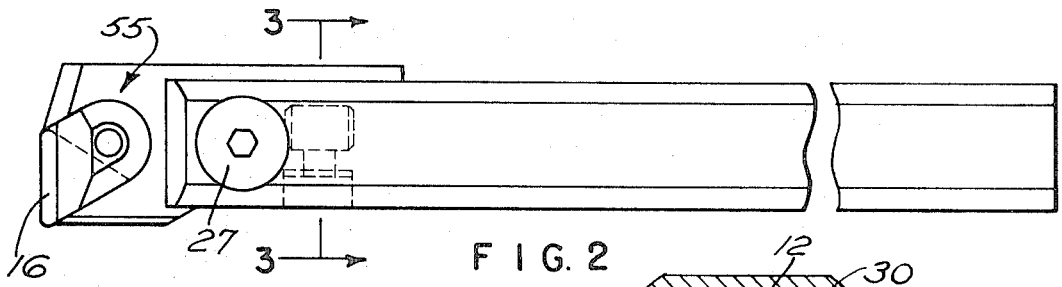
FIG. 2 is a top view thereof.
Figure 3:
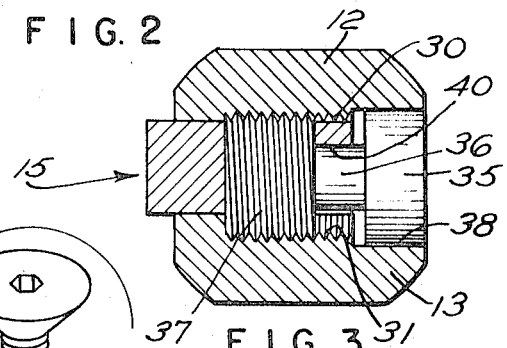
FIG. 3 is a sectional view taken on line 3—3 of FIG. 2.
Figure 4:
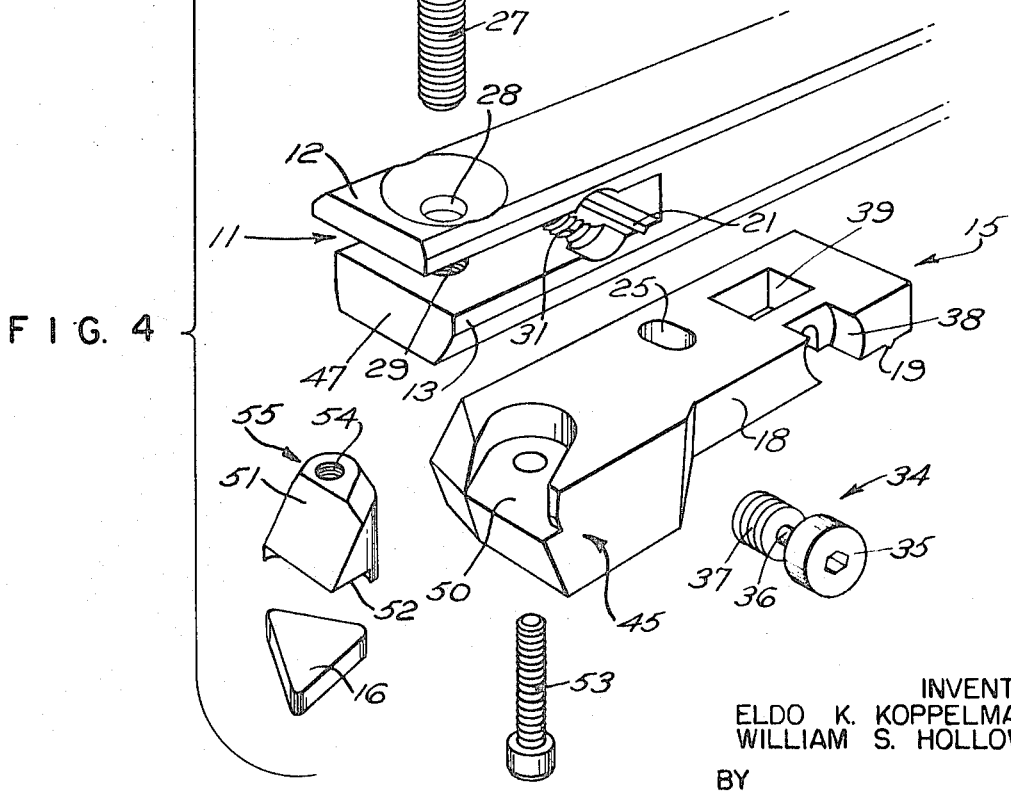
FIG. 4 is an exploded perspective view illustrating the parts of the adjustable boring bar.

With reference to the drawings, the boring bar of FIG. 1 comprises a body 10 which is illustrated as being square in cross section with chamfered edges and which is designed to be mounted in a machine tool. The front end of the boring bar is provided with a transverse slot generally indicated 11 which forms an upper lip 12 and a lower lip 13. The upper lip 12 is thinner than the lower lip 13 and as a result thereof is slightly more flexible. Mounted in the slot 11 is a cutter holder generally designated 15 which is arranged for positioning a cutting tool bit which is shown as a disposable cutter insert 16. The cutter holder 15 has a main body portion 18 that is provided with a V projection 19 on one face thereof. This projection is received in corresponding and interfitting V recess 21 located on the slot face of the lip 13. An elongated slot 25 is located in the cutter holder body and the cutter holder may be held in position in the slot 11 by virtue of the retaining and locking screw 27 that first passes through the hole 28 in the upper lip 12 and thence through the slot 25 and into a threaded bore 29 in the lower lip 13. The cutter holder may be adjusted transverse of the slot 11, and to this end, partial threads are cut into the upper lip 12 as at 30 and the lower lip 13 as at 31 and cooperating with these threads is a socket headed adjusting screw generally indicated 34 which has a head portion 35, a shank 36 and a threaded portion 37. The headed portion 35 is received in the notch 38 in the cutter holder and the threaded portion 37 is captured in the rectangular aperture 39, while the shank portion 36 is received in a U-shaped slot 40 that joins the recess 38 and the aperture 39.

The cutter holder is provided with a forward or nose portion generally designated 45 and this nose portion is larger in the thickness dimension than the captured body portion 18 of the cutter holder. To this end, it joins the portion 18 by an inclined surface 46 which mates with and has physical contact with the surface 47 of the lip portion 13. The cutter insert 16 is received in a recess 50 in this nose portion and a clamping block 51 with an undercut portion as at 52 holds the cutter insert 16 in position, the clamping block being held by a screw 53 passing up through the bottom wall of the recess 50 and through a threaded bore 54 in the clamping block 51. As illustrated in the drawing, the face 55 of the clamping block is inclined in such a way that chips generated by the cutter insert 16 will not be clogged and can flow rearwardly in the bore being machined while the tool is in operation.

The cutter holder 15 is maintained in the slot for guided lateral movement therein by guide means comprising a V guide projection and guideway mating notch 19, 21, together with the face contact of surfaces 46, 47. The lateral position of the cutter holder may be changed by rotating the adjusting screw 34 and it can be appreciated that since the threaded section 37 is captured in the aperture 39 that movement of the screw 34 along the threads 31, 37 will move the cutter holder. After the adjusted position is obtained, the clamping screw 27 may be tightened and this will spring the lips 12 and 13 together into tight clamping relationship with the upper and lower faces of the part 18 of the cutter holder. Further the force of the clamping screw 37 will provide a tighter wedge of the V projection and corresponding notch, and any tendency for rocking of the cutter holder in the slot is inhibited by the sliding face to face contact of the surface 46 of the nose 45 of the cutter holder against the surface 47 of the lower lip 13. It will be appreciated that deflection of the cutter holder will place lip 13 in compression and this structural arrangement therefore results in a much stiffer boring bar than has been provided heretofore.

Figure 5:
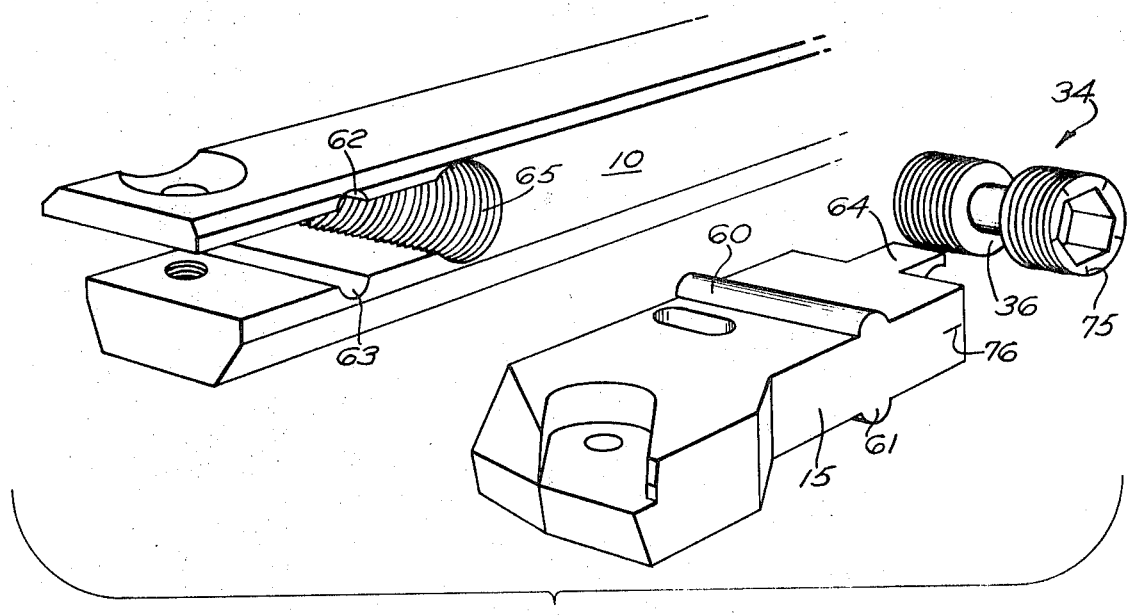
FIG. 5 is an exploded perspective view similar to FIG. 4 of a modified construction.

An alternate guiding means for the cutter holder 15 is shown in FIG. 5 where there is provided hemicylindrical ribs 60 on the upper surface and 61 on the lower surface of the holder 15 to slide in correspondingly shaped guideways 62 and 63 in the body 10. In this case a tongue 64 extending longitudinally to be received in notch 36 in the adjusting screw 34 which is threaded in the cross threaded bore 65 in the body 10.

Figure 6:
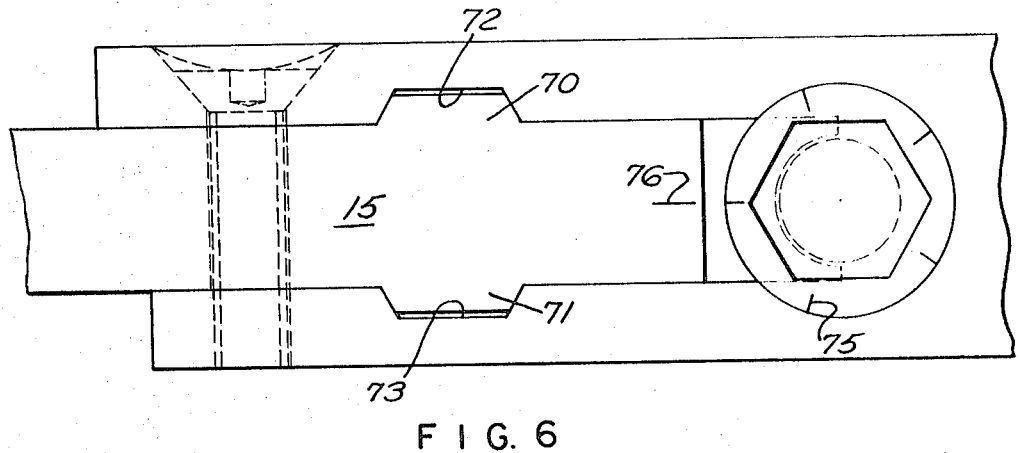
FIG. 6 is an elevation of a boring bar of a different modification.

A further alternate guiding means for the cutter holder is shown in FIG. 6 where there is provided a frustro-triangular protruding portion 70 on the upper surface and 71 on the lower surface of the cutter holder 15 to fit correspondingly shaped recesses 72 and 73 in the body 10 providing four spaced guiding surfaces. Marking 75 may also be provided on screw 34 to cooperate with a witness mark 76 on the cutter holder to show the lateral position thereof.

We claim:

1. A boring bar including a front portion having an end wall with a slot therein with substantially parallel facing walls defining a pair of lip portions, one of said lip portions being thinner than the other of said lip portions, said other lip portion having an inclined front face end surface whereby the said one lip portion is flexible, a cutter holder disposed in said slot, said cutter holder having means for adjusting the lateral position thereof in said slot and lateral first guide means for directing the movement thereof, said holder having a nose portion, a cutting tool bit mounted on the upper surface of the nose portion, said nose portion of the cutter holder being thicker than said slot and having an inclined surface complemental to and engaging the inclined front face end surface of said other lip portion to serve as a second guide means and to resist deflection forces applied normal to the longitudinal extent of the holder and means passing through said slot and holder for urging said walls and inclined surfaces toward each other for locking said holder therein, said one lip portion deflecting toward the other.

2. A boring bar as in claim 1 wherein the first guide means comprises a mating V projection and notch extending laterally across the holder and slot respectively.

* * * * *